United States Patent
Lollar (10) Patent No.: US 10,039,156 B2
(45) Date of Patent: Jul. 31, 2018

(54) CONDUIT READY ELECTRIC BELLY BAND HEATER USING SINGLE HOUSING AND METHOD OF USE

(71) Applicant: TUTCO, INC., Cookeville, TN (US)

(72) Inventor: James Patrick Lollar, Cookeville, TN (US)

(73) Assignee: TUTCO, LLC, Cookeville, TN (US)

( * ) Notice: Subject to any disclaimer, the term of this patent is extended or adjusted under 35 U.S.C. 154(b) by 404 days.

(21) Appl. No.: 14/820,937

(22) Filed: Aug. 7, 2015

(65) Prior Publication Data

US 2016/0044746 A1 Feb. 11, 2016

Related U.S. Application Data

(60) Provisional application No. 62/035,053, filed on Aug. 8, 2014.

(51) Int. Cl.
*H05B 3/06* (2006.01)
*H05B 3/34* (2006.01)
*H05B 3/36* (2006.01)
*H05B 3/56* (2006.01)
*F16B 2/00* (2006.01)

(52) U.S. Cl.
CPC ............... *H05B 3/56* (2013.01); *H05B 3/06* (2013.01); *H05B 3/565* (2013.01); *F16B 2/00* (2013.01)

(58) Field of Classification Search
None
See application file for complete search history.

(56) References Cited

U.S. PATENT DOCUMENTS

| | | | | |
|---|---|---|---|---|
| 2,817,742 A | * | 12/1957 | Drugmand | H05B 3/56 219/526 |
| 3,370,156 A | * | 2/1968 | Graves | H05B 3/50 165/169 |
| 4,312,121 A | * | 1/1982 | Tweed | F16L 53/008 174/653 |
| 6,557,620 B2 | | 5/2003 | Oshimo | |
| 6,844,531 B2 | | 1/2005 | Kirby | |
| 2004/0211770 A1 | * | 10/2004 | Renwick | H05B 3/06 219/541 |
| 2004/0256379 A1 | * | 12/2004 | Kirby | H05B 3/58 219/535 |
| 2005/0194377 A1 | * | 9/2005 | Kirby | H01R 4/72 219/535 |
| 2006/0191904 A1 | * | 8/2006 | Kirby | H01R 4/72 219/541 |
| 2008/0245782 A1 | * | 10/2008 | Kirby | H05B 3/56 219/262 |
| 2010/0320185 A1 | * | 12/2010 | Springer | H05B 3/56 219/201 |
| 2015/0181652 A1 | | 6/2015 | Lollar | |

* cited by examiner

*Primary Examiner* — Joseph M Pelham
(74) *Attorney, Agent, or Firm* — Clark & Brody (57) ABSTRACT

An electric belly band heater is configured with only one end of the heater cable assembly thereof having lead wires extending therefrom. A single housing box is positioned at the end of the heater cable assembly where the lead wires exit to encompass the lead wires and includes an opening to receive a conduit to provide further protection to the lead wires exiting the housing box and being connected to a power source.

10 Claims, 8 Drawing Sheets

CONDUIT READY ELECTRIC BELLY BAND HEATER USING SINGLE HOUSING AND METHOD OF USE

This application claims priority under 35 USC 199(e) from provisional application No. 62/035,053, filed on Aug. 8, 2014, which is incorporated in its entirety by reference herein.

FIELD OF THE INVENTION

The present invention is directed to an electric belly band heater that uses a single housing to facilitate the use of a conduit for the lead wires of the band heater.

BACKGROUND ART

U.S. Pat. No. 6,844,531 to Kirby discloses a belly band heater that uses a pair of conduit boxes, one box for each lead wire. The heater cable of the band heater is encased in a metal sheath and the resistance wire exits the metal sheath and is housed at the exit point by the conduit box. The conduit box can receive a conduit that the lead wire can pass through for connection to a power source. In certain applications, the use of two conduit boxes is not possible and the belly band heater of Kirby needs improvement.

Other belly band heaters use a heater cable assembly with two resistance wires therein, see U.S. Pat. No. 6,557,620. These heaters then have one end where the two resistance wires are internally connected and another end where two wires extend from the end for connection to the appropriate power source. The heater cable assembly of this heater is held together using a spring fastener and these fasteners are problematic.

SUMMARY OF THE INVENTION

The present invention is an improvement over the belly band heater of Kirby. The inventive belly band heater uses a single housing box to house two wires extending from an end of the heater cable assembly of the heater. The inventive belly band heater also uses silicone housed resistance wire(s) and zip tie segments to attach the ends of the heater cable assembly together.

The housing box is preferably made as a two part assembly to ease the assembly of the belly band assembly on a structure to be heated and handling of the wires exiting one end of the heater band assembly of the heater. A base part of the housing box is configured so that the surface that contacts the structure can flex to accommodate surfaces that are not flat.

The inventive heater can be used in any application where a structure needs to be heated by surrounding the structure with the heater cable assembly of the heater, positioning the housing box at one of the heater to house the ends of the wires exiting the end of the heater cable assembly and allowing a conduit to be attached to the housing box to allow the wires to extend from the housing box and through the conduit for connection to a power source.

DETAILED DESCRIPTION OF THE INVENTION

The inventive electric belly band heater provides an improved heater cable assembly designed to heat a structure such as a compressor or the like.

The heater cable assembly uses the basic manner to secure the ends of the heater cable assembly as disclosed in U.S. patent application Ser. No. 14/136,035, which is incorporated by reference in its entirety into this provisional application and a copy of the application is attached herewith for this purpose.

The feature of this application that is used in the invention is the use of zip tie segments to facilitate attaching and tightening of the heater cable assembly of the heater on a desired structure. That is, one end of the heater cable uses a male end of a zip tie and the other end of the heater cable employs the female end of a zip tie. The male end is slipped through the slot in the female end and pulled to tighten the heat cable assembly on the structure intended to be heated.

While the prior art teaches that a lead wire extends from each end of the heater cable, the inventive cable is configured so that both lead wires extend from only one end of the heater cable assembly. In conjunction with this sole exit point for the lead wires, a single housing box is employed to provide protection for the lead wires extending from one end of the heater cable assembly and accommodate the use of a fitting for a conduit so that the lead wires are protected not only when in the housing box but also when extending from within the housing box to a power source connection.

Each end of the heater cable assembly is uniquely configured to allow for the wires to extend from just one end of the heater cable assembly and allow for a robust linking of the heater cable ends using the zip tie segments.

It should be understood here that the arrangement of the zip tie and the heater cable ends can vary. That is, the end of the heater cable assembly that includes both lead wires extending therefrom can have either the male or the female part of the zip tie. Similarly, the end of the heater cable assembly that does not have any lead wire extend therefrom can use either the male or the female end of the zip tie. For description purposes, the end of the heater cable assembly that has no lead wires is shown with the male end and the end of the heater cable assembly with the two lead wires extending therefrom is shown with the female end of the zip tie but the invention is not so limited.

Figure 1:
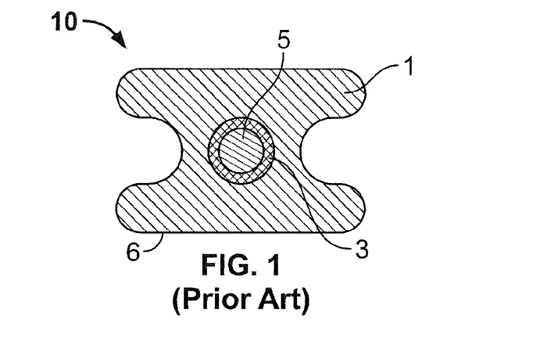
FIG. 1 shows a prior art silicon heater cable in cross section.

FIG. 1 shows a prior art silicone heater cable assembly 10 having a silicone insulation 1, which is in the shape of an I-beam. The silicone insulation 1 surrounds a fiberglass braid 3, which in turn surrounds a resistance wire 5. It should be understood that the resistance wire 5 can take the form of a wire that is helically wound on a fiber center core, which acts as an arbor. Hereinafter, either embodiment, a solid resistance wire or the helically wound wire on the core are called a "resistance wire." Since the helically wound resistance wire is well known by itself, an illustration is not deemed necessary for understanding of this embodiment. In fact, any type of resistance wire used in these types of band heaters is suitable for use herein. The resistance wire, when supplied with power, generates heat, which is conducted through the silicon insulation to the structure that would be in contact with face 6 of the heater cable 10.

Figure 2:
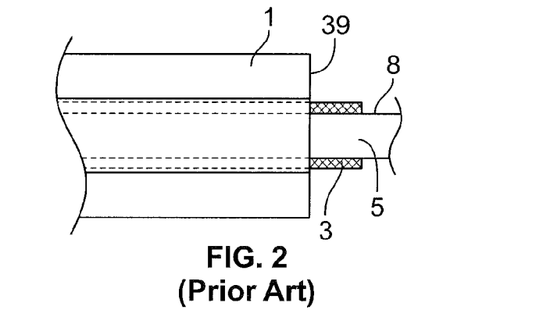
FIG. 2 shows an end view of the cable of FIG. 1.

FIG. 2 shows the end of the heater cable assembly 10, where a portion of the silicone insulation is removed to expose the fiberglass braid 3, wire 5, and end face 39 of the insulation. A portion of the fiberglass braid 3 is removed to produce a bare wire for splicing to a lead wire.

Figure 3:
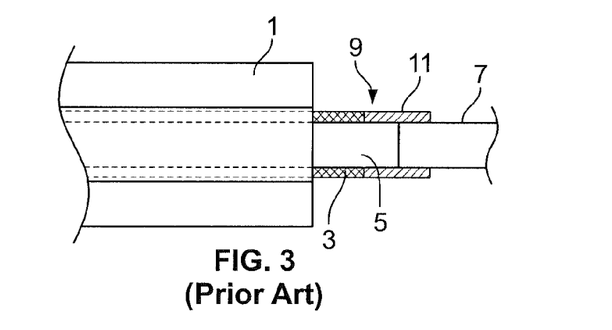
FIG. 3 shows a prior art connection between the wire of FIG. 2 and a lead wire.

FIG. 3 shows an example of a connection 9 between the exposed end 8 of the wire 5 and the lead wire 7. A metal crimp 11, as is known in the art, is used to mechanically link the end 8 of the wire 5 to the end of the lead wire 7.

Figure 4:
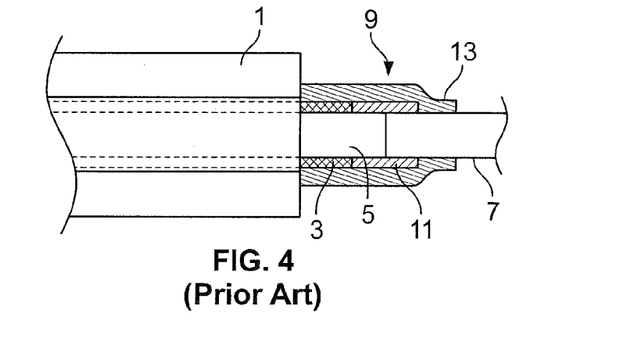
FIG. 4 shows the connection of FIG. 3 with heat shrink tubing.

In FIG. 4, a heat shrink tubing 13 can be used to surround the crimp 11 and exposed fiberglass braid 3 to make the connection strong.

In FIGS. 3 and 4, the fiberglass braid 3 is shown in combination with the resistance wire 5 and silicone insulation 1. However, the braid 3 could be omitted so that only the wire 5 and the silicone insulation 1 are used for heating purposes.

In addition, in FIG. 3, the fiberglass braid 3 is shown to surround the wire 5 when the silicone insulation 1 is removed. However, the fiberglass braid 3 could also be removed with the silicone insulation 1 such that the bare resistance wire end 8 extends from the end of the silicone insulation 1 that still covers the resistance wire 5.

Figure 5A:
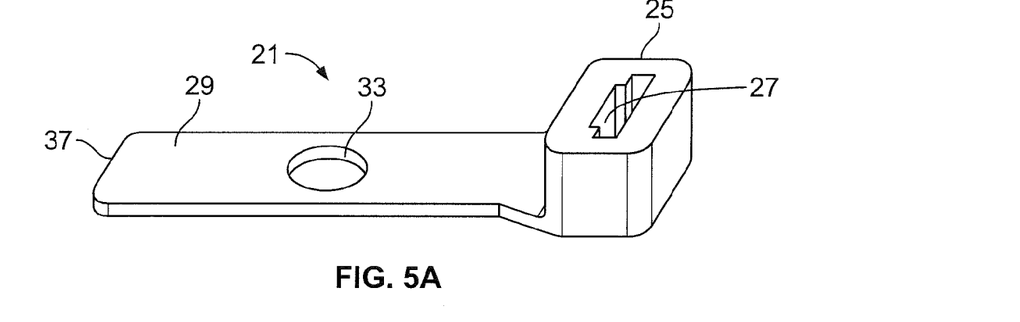
FIG. 5A shows a first zip tie segment for use in the invention.
Figure 5B:
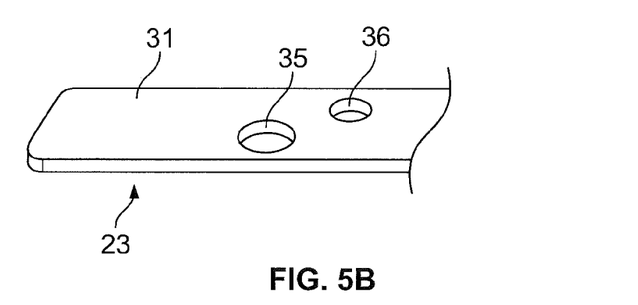
FIG. 5B shows a second zip tie segment for use with the zip tie segment of FIG. 5A.

The band heater assembly of the invention uses a zip tie to secure ends of the heater cable 10 together, as seen in FIGS. 5a and 5b. Here, a zip tie is cut into two segments, a first zip tie segment 21 and a second zip tie segment 23. The segment 21 includes the head end 25 with its slot 27 and a tape section 29, which is used to attach to one end of the heater cable 10.

The other zip tie segment 23 just comprises a tape section 31 having a length so that the end of the tape section 31 can be inserted into the slot 27 of the head end for pulling of the ends of the heater cable assembly 10 together and clamping the heater cable assembly to a structure for heating. It should be understood that the tape section includes the teeth that engage in the slot 27, although the teeth are not illustrated since this configuration is well known in the field of zip ties. One zip tie segment 21 has a throughhole 33 and the other zip tie segment has two throughholes 35 and 36.

The throughhole 33 and zip tie segment 21 is designed to interface with the end of the heater cable that does not have a lead line extend therefrom. The zip tie segment 23 with two openings is designed for use with the end of the heater cable assembly that has both lead lines extending therefrom. In the alternative, one throughhole could be used to allow both lead wires to pass therethrough.

The throughholes 33, 35, and 36 are sized to permit a given lead wire 7 to pass therethrough to enhance the attachment of each tape section 29 and 31 to each splice connection 9. The fact that the wire 7 is pulled through the hole 33 in the zip tie segment 21 and then molded into place, as detailed below, means it would take extreme tension to pull the zip tie loose and therefore the zip tie can provide the strength needed while the zip tie is being pulled into place on a given structure, e.g., a compressor shell.

Figure 6:
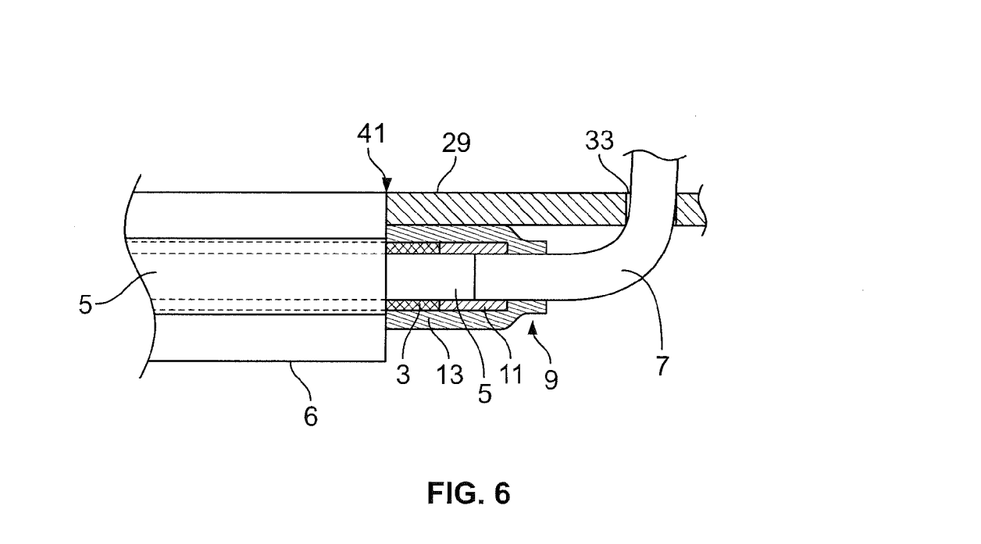
FIG. 6 shows the zip tie segment of FIG. 5A a heater cable and lead wire assembly.

Referring to FIG. 6, the end 37 of the tape section 29 of the zip tie segment 21 is butted against the end face 39, see FIG. 2, at 41 and the lead wire 7 extends through the opening 33 in the tape section 29. In FIG. 6, it should be noted that the connection 9 is disposed between the tape section 29 and a structure (not shown) so that the face 6 of the heater cable 10 would rest on the structure when the band heater is in place for heating. In this way, the heated portion of the band is adjacent to the structure and this forces the heat to move toward the structure and the tape section 29 is kept cooler during heating operation.

Figure 7:
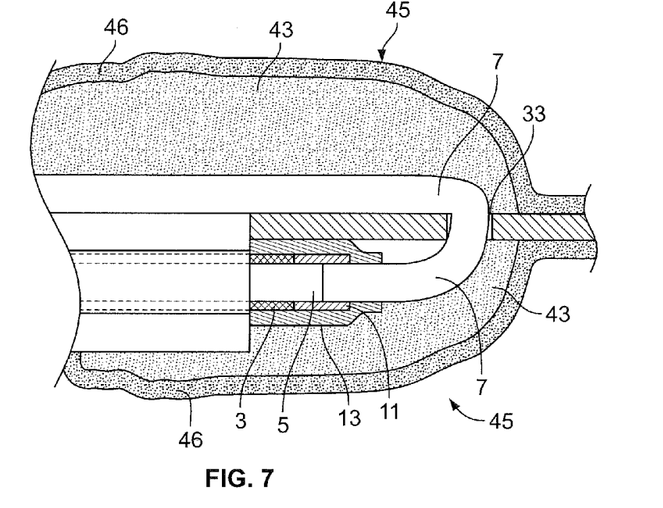
FIG. 7 shows the assembly of FIG. 6 in an overmolded state.

Once the tape section 29 is in place, the tape section can be overmolded to hold it in place. This overmolding is a well-known technique and is used in other band heaters so that the details thereof are not needed for understanding of the invention. The overmolding layer is shown in FIG. 7 as 43 and the overmolded part of the heating cable assembly having the connection and tape section of the zip tie segment is identified with the reference numeral 45. The arrangement shown in FIG. 7 is collectively described below as a splice connection, which presents the splice connection and the covering of the splice connection and zip tie segment.

Typically, a silicone molding compound is applied to one side of the assembly and pressed into place. This is followed by a molding compound being applied to the opposite side as well. The silicone molding compound is then pressed and heated so that the material will bond to itself and the components of the heater cable and splice connection. Since the overmolding process would be automated, trimming the molding compound from the heater cable is normally not a requirement. The overmolding process produces a low profile molding that insulates the electrically live portions and bonds the molding compound to the heater band and itself. The overmolding method allows the molding compound to stick to itself during the overmolding step. This adds substantial strength to the band heater assembly. Once the compound cures it is difficult to pull the cured compound through the zip tie segment slot 27 and break the band heater assembly.

If desired, the overmolded part of the cable assembly can be surrounded with another heat shrink tubing 46, which is also shown in FIG. 7. However, the heater cable assembly is perfectly functional using just the splice connection 9 with its crimp and heat shrink tubing 13, and throughhole-containing zip tie segment 21. It should also be understood that for the splice connection 9, it is possible to use just the metal crimp to attach the ends of the lead wire 7 and the resistance wire 5 together, but the use of the heat shrink tubing 13 does improve the connection.

The overmolding 43 can be trimmed to size so that it is more similar in shape to the heater cable 10. This also helps in reducing any fit problems with the band heater and the structure intended to receive it.

The assembly shown in FIG. 7 is similar to that for tape section 31 of the zip tie segment 23. The main difference though would be that the end of the lead wire running through the heater cable assembly would also pass through the tape section 31 and along with the lead wire connected to the other end of the resistance wire and prior to extending from one of the ends of the heater cable assembly.

Another difference is that the zip tie segment 23 is designed to handle two wires since there are two wires extending from the end of the heater cable assembly. This is contrast to the other end of the heater cable assembly, wherein the zip tie segment interfaces with the lead wire, but only the zip tie segment extends from the splice connection to facilitate linking of the ends of the heater cable assembly.

Still with reference to FIG. 7, the lead wire 7, after passing through the zip tie segment opening 33 reverses its course and runs along the length of the heater cable assembly 10 and exits the other end of the heater cable assembly 10 to pair with the exiting lead wire that is spliced to the resistance wire at the other end of the heater cable assembly 10.

The lead wire 7 can be held with the heater cable 10 by the use of the high temperature heat shrink tubing 46. Since the lead wire runs with the heater cable assembly, the heat shrink wrap would extend along the length of the heater cable assembly so that the lead wire 7 is made an integral part thereof. The doubled over lead wire could be covered with the molding compound 43 and then covered again with the heat shrink tubing so that it is an integral part of the heater cable assembly 10. While it could be possible to incorporate the lead wire 7 into the silicone insulation when making the heater cable assembly, this would also require making the splice connection and including the zip tie segment as part of this manufacture so that the end of the heater cable only has the zip tie segment extend therefrom.

For disclosure purposes, the splice connection can include the components described above to make the connection, i.e., the metal crimp, heat shrink tubing, molding compound, etc.

In the FIGS. 2-7 embodiment, one lead wire runs with the resistance wire along the length of the heater cable assembly so that there is only the zip tie segment that extends from the one end of the heater cable assembly.

However, heater cable assembly in FIG. 7 could be replaced with a dual resistance wire heater cable. In this embodiment, the two resistance wires are either spliced or the heater cable is made so that the resistance wire reverses course at the end of the heater cable lead wire. Preferably, a splice connection is made similar to that shown in FIG. 7 so that the engagement between the resistance wires and zip tie segment can occur to strengthen the attachment of the zip tie segment to the heater cable assembly.

Figure 8:
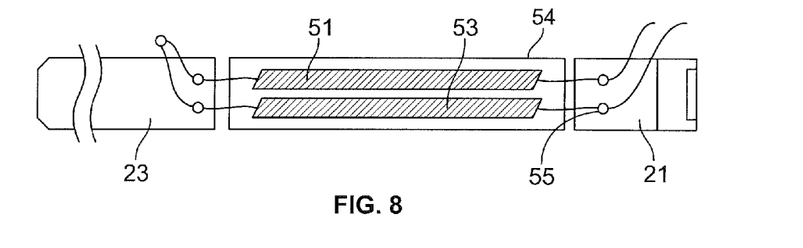
FIG. 8 shows a second embodiment of the invention using two resistance wires.
Figure 9:
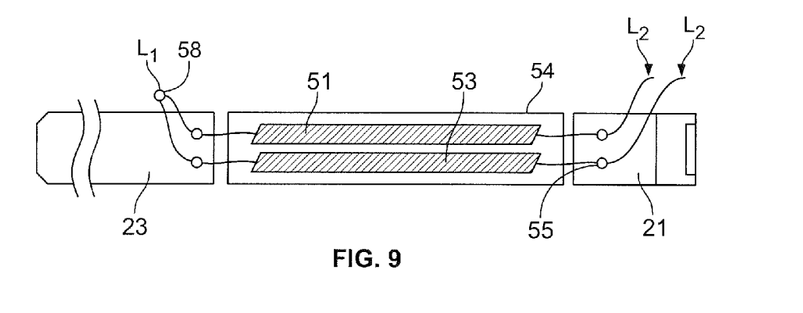
FIG. 9 shows the embodiment of FIG. 8 in a two stage heating application mode.

This second embodiment of the invention, shown in FIGS. 8 and 9, involves using a pair of resistance wires 51 and 53 running through the heater cable 54. With this embodiment, one end of the heater cable assembly would include a splice to connect the two resistance wires together and the two wires would interface with the tape section of a zip tie segment.

The other resistance wires would extend from the other end of the heater cable assembly, also going through the tape section for connection to lead wires.

Additionally, another advantage associated with the invention shown in FIG. 8 is that at least a 2-stage heater can be produced. FIG. 9 shows a schematic drawing of the arrangement of the lead wires with the splice connection 58 between the two resistance wires 51 and 53 on the left side of the drawing and the terminating ends of the two wires on the right side of the drawing having the designations L2 and L2. Now, more than a one stage heater is possible. In addition, thermostat controls to turn all or part of the heaters on and off based on temperature and demand could be included to thereby improve the efficiency and performance. This is a significant advantage over prior art heaters like that shown in U.S. Pat. No. 7,442,904 to Kirby. The Kirby patent is only a single stage heater so that all of the heat for the structure to be heated is either being applied or not being applied. With the two stage heating capability of FIGS. 8 and 9, the heater provides multiple heaters that can be turned on and off using the appropriate controls. For example, either or both of the circuits shown in FIG. 9 could be powered for heating purposes.

In the FIGS. 8 and 9 embodiment, there is no lead wire splicing at the one end of the heater cable like in the embodiments discussed above. The only splice connection would be between the two resistance wires of the heater cable assembly. This splice connection could be made just like the splice connection described above when using a lead wire and a resistance wire.

In combination with the heater cable assembly described above having one end with one half of the zip tie and no extending wires, and the other end of the heater cable with the two wires extending therefrom is a housing box. The housing box is designed to encompass the exiting wires from the end of the heater cable assembly so as to protect them and also serve as a way to connect a conduit so that the wires extending from the heater cable end are not only protected by the housing box but are also protected when exiting the housing box by virtue of a conduit coupled to an opening in the housing box.

While the housing box could be a one piece box, a preferred embodiment of the housing box is a two part box. One part serves as a base part that allows for easier interfacing with the wires extending from the end of the heater cable assembly. The base part also is designed such that it can flex and adapt to a surface of the structure that is being heated using the heater cable. The top part is removably attached to the base part. With the top part not yet secured to the base part, the wires can be easily pulled through the opening in the top part and then the top part can be attached to the base part. Of course, the top part could be attached first and then the wires extending from the end of the heater cable assembly could be passed through the opening. Further yet, a one piece housing box could allow the zip tie segment and wires to pass through the housing box so that the end of the zip tie segment can be used for attachment purposes and the lead wires can extend through a conduit.

Figure 10A:
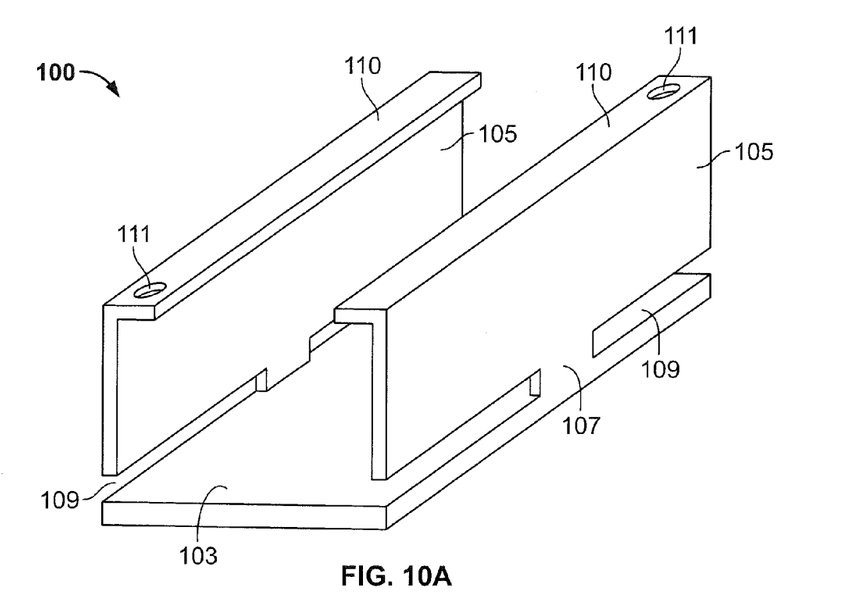
FIG. 10A shows one embodiment of a base part of a housing box for the heater cable assembly.
Figure 10B:
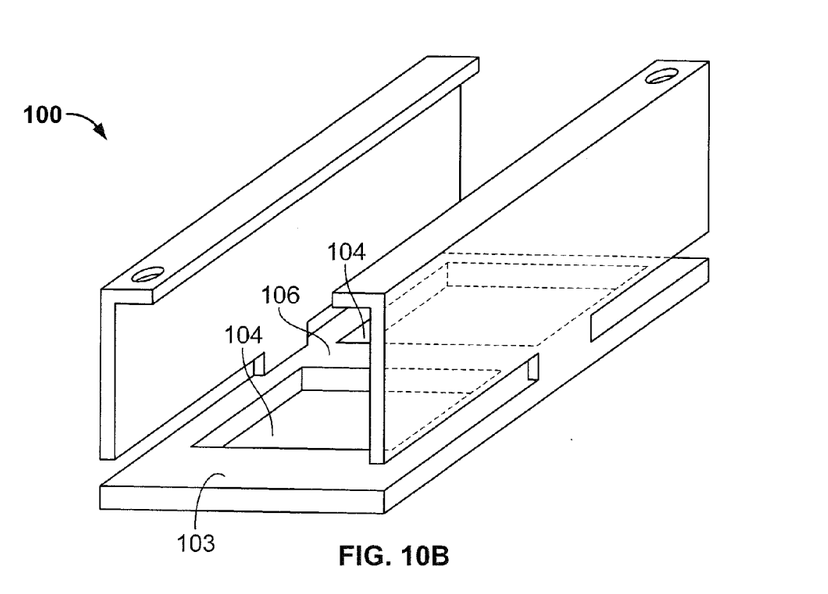
FIG. 10B shows an alternative to the embodiment of FIG. 10A.
Figure 11:
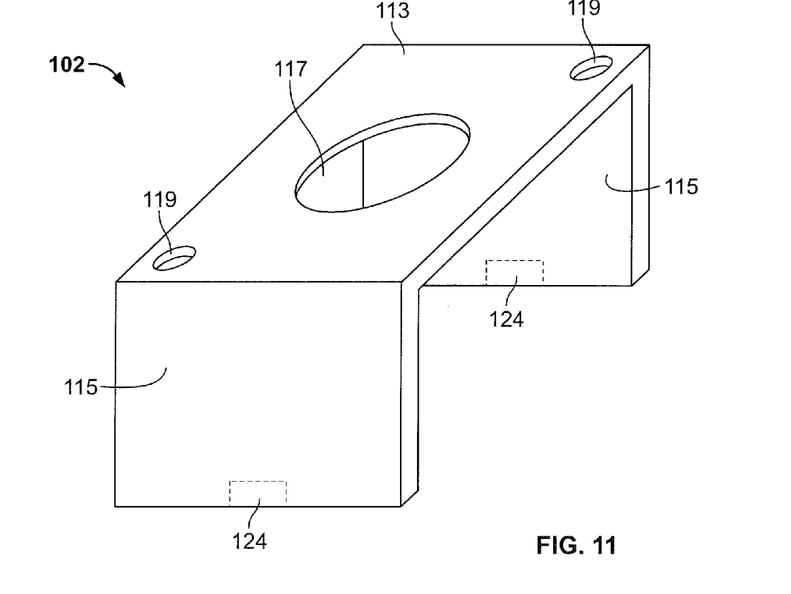
FIG. 11 shows the top part of the housing box.

FIGS. 10A and 11 show drawings of the base part 100 and top part 102. The base part 100 has a base plate 103, and two sides 105. The sides 105 are joined to the base plate 103 at the junction 107. This creates cutouts or spaces 109 that run along the length of the base part 100. These cutouts 109 allow the base plate 103 to flex and adapt to a curved surface like that of a compressor. The sides 105 include flanges 110, which form a surface to allow for attachment of the top part 102. The flanges include openings 111 to receive a fastener, e.g., a screw to allow the top part to be removably attached to the base part. The cutouts are one way to provide flex in the base plate to allow the base plate to flex but other ways could also be employed as well, e.g., make the base plate of a flexible enough material that it will flex, add additional cutouts in the base plates, see FIG. 10B below.

The top part 102 includes a top portion 113 and two sides 115. The sides 115 cooperate with the sides 105 of the base part to form a surrounding wall, which forms a housing box with the base part plate and top portion 113. The top portion 113 also includes an opening 117 and attachment facilitating openings 119. The openings 119 allow for passage of a screw, the screw threading to the openings 111 in the base part 100.

The opening 117 allows the wires extending from the end of the heater cable assembly to exit the housing box formed by the top and base parts 100 and 102. A conduit can be attached to the opening using the appropriate fitting as is known in the art so that the wires extending from the end of the heater cable assembly are protected both in the housing box and in the conduit.

It should be understood that the sides 115 of the top part 102 are sized so that the end of the heater cable can be enclosed in the interior of the housing box so that the wires are also enclosed. This means that one side is sized to allow the heater cable assembly to pass under the side 115 and that the zip tie segment of this end of the heater cable assembly can pass through the other side 115 so that the two zip tie segments can be linked together and the heater cable assembly secured to the structure to be heated.

The overall height of the sides can be adjusted to allow for passage of the heater cable assembly or the sides can include cut outs 124, shown in cross hatch in FIG. 11 to allow for passage of the tape section or the heater cable assembly.

The base part 100 can be held in place by the action of the zip ties tightening the heater cable around the desired structure. In the alternative, the base part could be attached to the structure in some fashion to hold it in place, e.g., fasteners, adhesive, welding, rivets, etc.

Figure 10C:
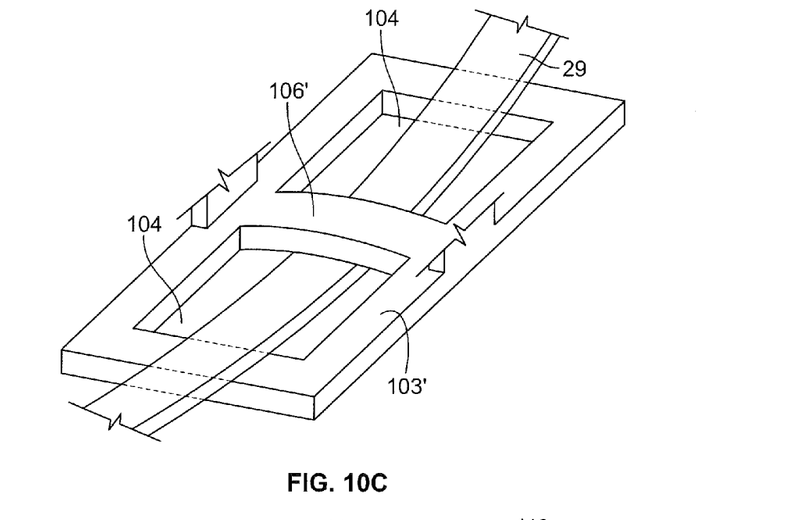
FIG. 10C shows the part of FIG. 10B interfacing with a zip tie segment.

FIG. 10B shows another embodiment of the invention. In this embodiment, additional cutouts 104, which are separated by a center portion 106 are formed in the base plate 103' to enhance the flexing and accommodation to structures that are not flat. A further variation of the embodiment of FIG. 10B can be seen in FIG. 10C. Here, back plate 103' has a center portion 106'. The portion 106' is made into a curved shape to create a gap between a surface of the structure to be heated and an underside of the portion 106'. This gap allows the zip tie segment tape section 29 to pass under the portion 106' and be held in place. In an alternative, the zip tie could be riveted to the back plate 103 that is shown in FIG. 10A.

Figure 12:
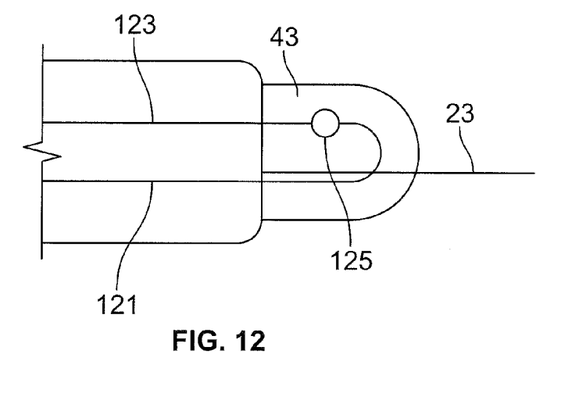
FIG. 12 shows a schematic drawing of one end of the heater cable assembly showing the zip tie segment in use.
Figure 13:
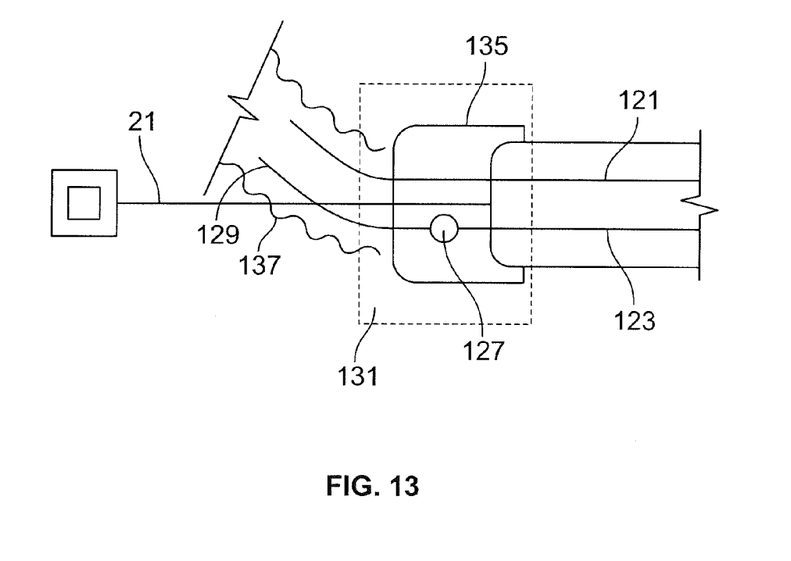
FIG. 13 shows a schematic drawing of the other end of the heater cable assembly shown in FIG. 12 showing the zip tie segment in use.

FIGS. 12-15 show schematically the two embodiments of the invention. In FIGS. 12 and 13, the lead wire 121 is part of the heater cable assembly and this lead wire 121 extends through the zip tie segment 23 as described above. However, it could be that both the lead wire 121 and the resistance wire 123 extend through the zip tie segment 23, either through separate holes or one hole to give further strength when the heater cable ends are connected.

While a straight splice 125 is shown between the lead wire 121 and the resistance wire 123, where the lead wire makes an 180 degree bend, another splice configuration could be used to eliminate the 180 degree bend, i.e., use a u-shaped metal crimp rather than a straight one as described above. Alternatively, a butt connector, which would be the equivalent of using a wire nut to make the connection between the lead wire and the resistance wire could be used, thus eliminating the bend.

FIG. 13 shows the other splice 127 for the lead wire 129 to the resistance wire and placement of the housing box 131, the overmolding 135, and conduit 137.

Figure 14:
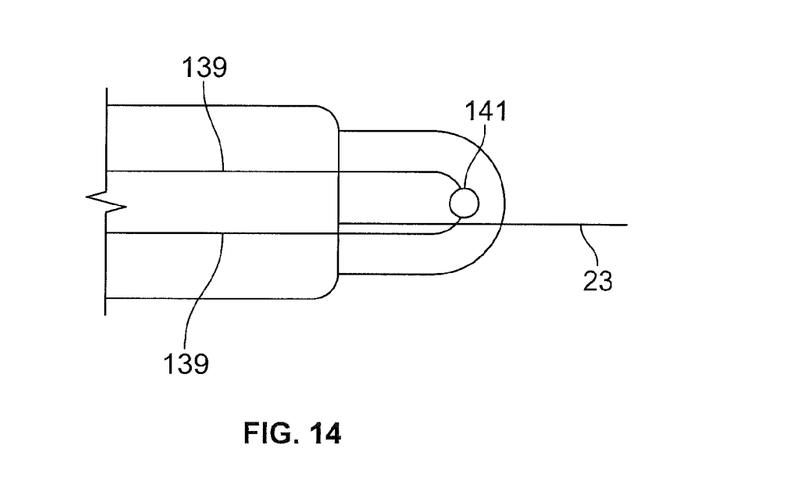
FIG. 14 shows a schematic drawing similar to FIG. 12 but with two resistance wires in the heater cable.
Figure 15:
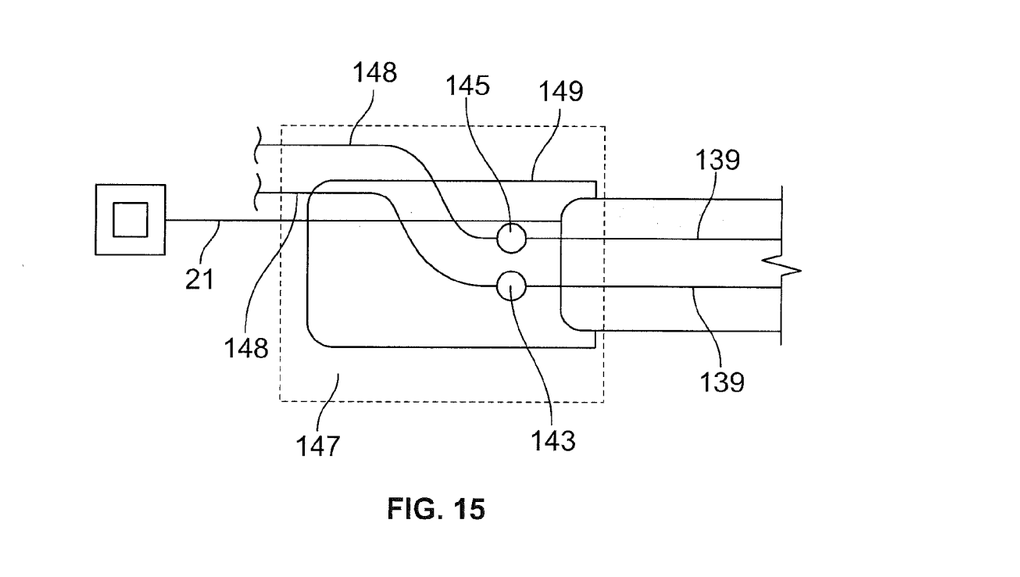
FIG. 15 shows a schematic drawing similar to FIG. 13 but with two resistance wires in the heater cable.

FIGS. 14 and 15 show the embodiment wherein the resistance wires 139 are spliced together at 141 on the overmolded end 141 of the heater cable that does not have any wires extending therefrom. In this embodiment, the lead wires 148 are shown passing through the zip tie segment 21 in FIG. 15, with the splices 143 and 145 preceding the passing through. The housing box 147 and overmolding 149 are also illustrated. However, one or both of the resistance wires at the splice end could go through the zip tie segment, and the splice would be downstream of the pass through of the zip tie segment. With both of the wires going through the zip tie segment, additional strength is obtained for the tightening of the heater cable assembly.

Figure 16:
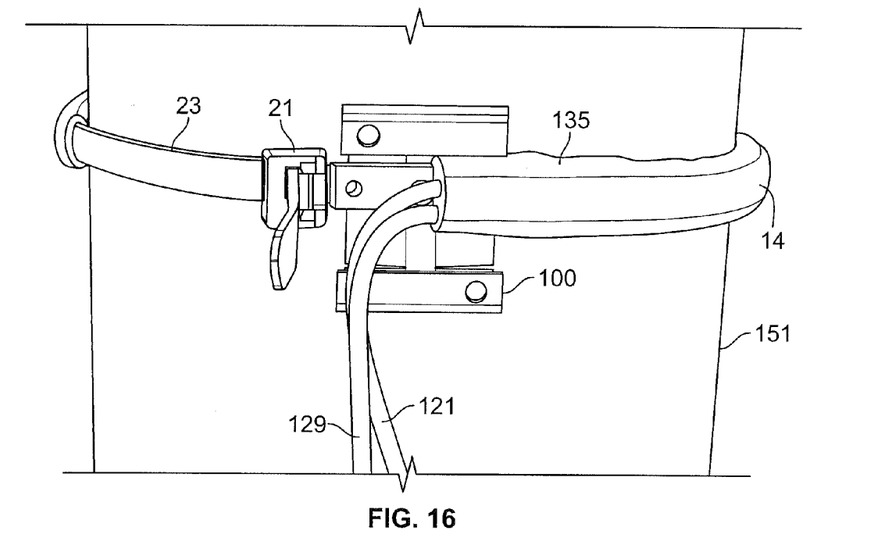
FIG. 16 shows a view of the heater cable assembly installed but without the top part.
Figure 17:
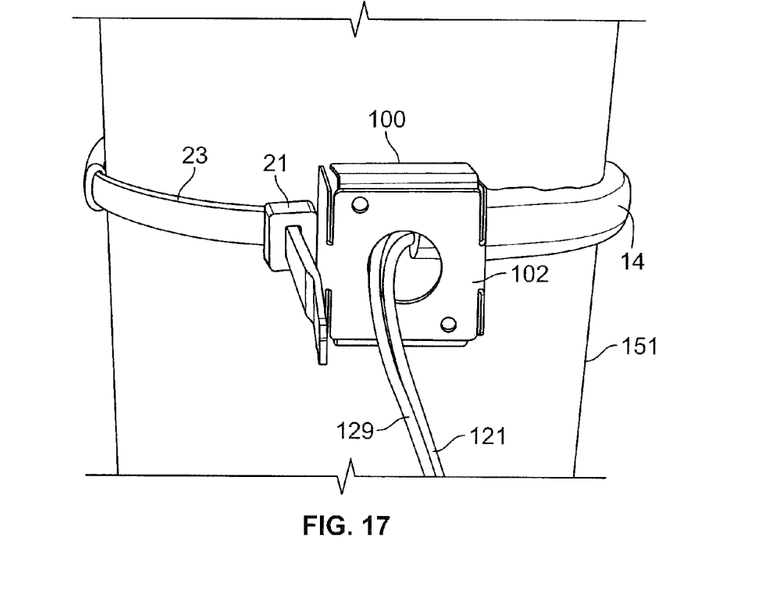
FIG. 17 shows a view of the heater cable assembly of FIG. 16 installed with the top part.

FIG. 16 shows the heater cable assembly, including the heater cable 14, surrounding a structure 151 with the zip tie segments 21 and 23 connected and the lead wires 121 and 129 extending from the overmolding 135. This configuration is similar to that shown in FIG. 13 except that the overmolding 135 also covers where the wire 129 passes through the zip tie segment 21, and the housing covers part of the overmolding. The structure 151 is typically a compressor but it can be anything that requires heating from the heater cable assembly. The base plate 100 is depicted without the top part 102. FIG. 17 shows the top part 102 in place with the lead wires 121 and 129 extending from the opening 117 in the top part 102. The housing box is normally made out of the typical materials used for electrical connections but it could be made of a non-metallic material, e.g., a plastic material. The housing box could also be used in a retrofit fashion, wherein an existing belly band heater could be modified to use the single housing box.

The invention provides significant advantages over the prior art in the use of one housing box, the ability for a two stage heater, and the ability of the housing box to more easily adapt to surfaces that are not flat.

More particularly, one advantage for the inventive heater is the conduit housing construction. As is known in the art, the typical installation for a belly band type heater is attachment to a compressor, which could have a cylindrical shape or at the very least a curved outer shape of some type. One typical problem with the conduit boxes used in prior art heaters is the fact that the conduit box is normally flat and is attached to a curved shape. This attachment can leave a gap behind the conduit box as it does not easily contour to match the compressor shape. This leaves the designer with having to make a recessed type box to fit the contour, but this can really only fit specific contoured shapes and certainly could not be extremely flexible and able to contour too many different shapes. The gap can be envisioned by placing a ruler on a cylinder and a space will extend from the tangent point along the ruler.

This design of the inventive heater cable assembly allows for the heater conduit box to easily conform to the contoured shapes. The inventive conduit box can actually have four sides as well as a top and bottom. The bottom portion would be preferably located behind the zip tie segment used to tighten the assembly. Additionally, the conduit box bottom, with its cut-outs, is designed in such a way as to contour to the compressors (or item to be heated) shape, as the band is tightened.

As such, an invention has been disclosed in terms of preferred embodiments thereof which fulfills each and every one of the objects of the present invention as set forth above and provides a new and improved belly band heater cable assembly and method of use.

Of course, various changes, modifications and alterations from the teachings of the present invention may be contemplated by those skilled in the art without departing from the intended spirit and scope thereof. It is intended that the present invention only be limited by the terms of the appended claims.

The invention claimed is:

1. An electric band heater cable assembly comprising:
a heater cable assembly comprising a resistance wire encased in a silicone insulator, the heater cable assembly having a first cable end and a second cable end;
first and second lead wires,
a first splice connection between a first end of the first lead wire and one end of the resistance wire at the first cable end;
a second splice connection between a first end of the second lead wire and the other end of the resistance wire; each of the first and second splice connections extending from each of the first and second cable ends of the heater cable assembly;
the first lead wire running with the resistance wire and encased in the silicone insulator and extending beyond the second cable end so that the first and second lead wires both extend from the second cable end;
a zip tie, divided into a first zip tie segment comprising a head end with a slot and first tape section and a second zip tie segment comprising a second tape section, one of the first and second tape sections having one opening and the other of the first and second tape sections having at least one opening, the one opening sized to allow the first lead wire to pass through and the at least one opening allowing the first and second lead wires to pass therethrough,
the first tape section attached to one of the first and second splice connections and the second tape section attached to the other of the first and second splice connections,
a single housing assembly having a bottom half and a top half, the bottom half comprising a bottom plate and a pair of opposing side, the bottom plate and pair of opposing sides connected at a junction portion to leave cut-outs between separate a bottom edge of the sides to a side edge of the bottom, thereby allowing the bottom to flex when contacting a curved surface of a structure to be heated,
the top half comprising a top plate with an opening to allow the first and second lead wires to pass therethrough, for connection to a source of power, and pair of opposing sides, joining the top and bottom halves forming the single housing assembly, the first and second zip tie segments forming a connected heater cable assembly.

2. In a method of heating a structure using an electric belly band heater, the improvement comprising using the heater cable assembly of claim 1.

3. An electric band heater cable assembly comprising:
a heater cable assembly comprising a pair of resistance wires encased in a silicone insulator, the heater cable assembly having a first cable end and a second cable end;
a first splice connection between ends of the resistance wires at the first cable end;
a second splice connection between ends of the resistance wires at the second cable end;
a zip tie, divided into a first zip tie segment comprising a head end with a slot and first tape section and a second zip tie segment comprising a second tape section, one or both of the resistance wire ends at the first cable end passing through one of the first and second tape sections and one or both of the resistance wire ends of first and second lead wires passing through the other of the first and second tape sections, the first tape section attached to one of the first and second splice connections and the second tape section attached to the other of the first and second slice connections,
a single housing assembly having a bottom half and a top half, the bottom half comprising a bottom plate and a pair of opposing side, the bottom plate and pair of opposing sides connected at a junction portion to leave cut-outs between separate a bottom edge of the sides to a side edge of the bottom, thereby allowing the bottom to flex when contacting a curved surface of a structure to be heated,
the top half comprising a top plate with an opening to allow the first and second lead wires to pass therethrough, for connection to a source of power, and pair of opposing sides, joining the top and bottom halves forming the single housing assembly, the first and second zip tie segments forming a connected heater cable assembly.

4. In a method of heating a structure using an electric belly band heater, the improvement comprising using the heater cable assembly of claim 3.

5. An electric belly band heater comprising a heater cable assembly, the heater cable assembly having one resistance wire passing therethrough, one end of the heater cable assembly having a first splice connection between an end of the resistance wire and a first lead wire such that the first lead wire returns to the other end of the heater cable assembly and a zip tie segment extends from the first splice connection, the other end of the heater cable assembly having a second splice connection between the other end of the resistance wire and a second lead wire, another zip tie segment and the second lead wire extending from the second splice connection, a housing box surrounding the first and second lead wires extending from the second splice connection and having an opening to accommodate a conduit.

6. The heater of claim 5, wherein the first and second lead wires pass through the second zip tie segment extending from the second splice connection.

7. In a method of heating a structure using an electric belly band heater, the improvement comprising using the heater cable assembly of claim 5.

8. An electric belly band heater comprising a heater cable assembly, the heater cable assembly having two resistance wires passing therethrough, one end of the heater cable assembly having an first splice connection connecting first ends of the two resistance wires and a zip tie segment extends from the first splice connection, the other end of the heater cable assembly having a second splice connection between the other ends of the resistance wire and first and second lead wires, another zip tie segment and the first and second lead wires extending from the second splice connection, a housing box surrounding the first and second lead wires extending from the second splice connection and having an opening to accommodate a conduit.

9. The heater of claim 8, wherein the first and second resistance wires pass through the first zip tie segment extending from the first splice connection and the first and second lead wires pass through the second zip tie segment extending from the second splice connection.

10. In a method of heating a structure using an electric belly band heater, the improvement comprising using the heater cable assembly of claim 8.

\* \* \* \* \*